US012435484B2

(12) United States Patent
Wang et al.

(10) Patent No.: US 12,435,484 B2
(45) Date of Patent: Oct. 7, 2025

(54) SYSTEM AND METHOD FOR MONITORING EARTH PRESSURE AND DISPLACEMENT OF MINIATURE STEEL PIPE PILE BODY

(71) Applicants: QINGDAO UNIVERSITY OF TECHNOLOGY, Qingdao (CN); Qingdao Green Technology Geotechnical Engineering Co., Ltd., Qingdao (CN); Chongqing University, Chongqing (CN)

(72) Inventors: Yonghong Wang, Qingdao (CN); Shujuan Yang, Qingdao (CN); Wengang Zhang, Qingdao (CN); Jiangbin Wu, Qingdao (CN); Jian Huang, Qingdao (CN); Qianqing Zhang, Qingdao (CN); Qijun Zhang, Qingdao (CN); Lei Su, Qingdao (CN); Bingxiang Yuan, Qingdao (CN); Jifei Cui, Qingdao (CN); Xiang Fang, Qingdao (CN); Chuantong Zhang, Qingdao (CN); Guodong Shao, Qingdao (CN); Zhaolong Li, Qingdao (CN); Lin Cui, Qingdao (CN)

(73) Assignees: QINGDAO UNIVERSITY OF TECHNOLOGY, Qingdao (CN); Qingdao Green Technology Geotechnical Engineering Co., Ltd., Qingdao (CN); Chongqing University, Chongqing (CN)

( * ) Notice: Subject to any disclaimer, the term of this patent is extended or adjusted under 35 U.S.C. 154(b) by 441 days.

(21) Appl. No.: 17/581,912

(22) Filed: Jan. 22, 2022

(65) Prior Publication Data

US 2022/0145574 A1 May 12, 2022

Related U.S. Application Data

(63) Continuation of application No. PCT/CN2020/103599, filed on Jul. 22, 2020.

(30) Foreign Application Priority Data

Jul. 31, 2019 (CN) ......................... 201910697610.4
Jul. 31, 2019 (CN) ......................... 201910697626.5
(Continued)

(51) Int. Cl.
*E02D 1/00* (2006.01)
*E02D 5/30* (2006.01)
(Continued)

(52) U.S. Cl.
CPC ............... *E02D 33/00* (2013.01); *E02D 1/00* (2013.01); *E02D 5/30* (2013.01); *G01L 1/22* (2013.01);
(Continued)

(58) Field of Classification Search
CPC ..... E02D 33/00; E02D 5/30; E02D 2250/003; E02D 2300/0029; E02D 2600/10;
(Continued)

(56) References Cited

FOREIGN PATENT DOCUMENTS

| | | | |
|---|---|---|---|
| CN | 102409703 | A | 4/2012 |
| CN | 103603330 | A | 2/2014 |

(Continued)

OTHER PUBLICATIONS

Internation Search Report of PCT/CN2020/103599, mailed Oct. 22, 2020.

*Primary Examiner* — Robert R Raevis

(57) ABSTRACT

A system and method for monitoring an earth pressure and displacement of a miniature steel pipe pile body. Sensor installation holes are drilled at predetermined positions outside the steel pipe pile body and sensor metal protective shell with a thickness slightly lower than that of the XY-TY02A resistance-type miniature earth pressure gauge is welded on the steel pipe pile body. The XY-TY02A
(Continued)

resistance-type miniature earth pressure gauges are stuck on the steel pipe pile body. The transmission line of the XY-TY02A resistance-type miniature earth pressure gauges passes through the sensor installation holes and are connected to data acquisition system. The reflective sheet base is welded at the preset position of the miniature steel pipe pile and the reflective sheet is attached to the reflective sheet base to realize displacement monitoring.

8 Claims, 2 Drawing Sheets

(30) Foreign Application Priority Data

Jul. 31, 2019 (CN) ........................ 201910697627.X
Jul. 31, 2019 (CN) ........................ 201910697633.5
Jul. 31, 2019 (CN) ........................ 201910697634.X

(51) Int. Cl.
*E02D 33/00* (2006.01)
*G01L 1/22* (2006.01)

(52) U.S. Cl.
CPC .................. *E02D 2250/003* (2013.01); *E02D 2300/0029* (2013.01); *E02D 2600/10* (2013.01)

(58) Field of Classification Search
CPC .. E02D 1/00; E02D 1/02; E02D 1/022; E02D 1/08; G01L 1/22
USPC ..... 73/783, 784, 714, 862.627, 866.5, 865.8
See application file for complete search history.

(56) References Cited

FOREIGN PATENT DOCUMENTS

| | | | | |
|---|---|---|---|---|
| CN | 105155598 | A | | 12/2015 |
| CN | 205954721 | U | | 2/2017 |
| CN | 107178074 | A | | 9/2017 |
| CN | 110468887 | A | | 11/2019 |
| CN | 110468888 | A | | 11/2019 |
| CN | 110468889 | A | | 11/2019 |
| CN | 110485481 | A | | 11/2019 |
| CN | 110485482 | | * | 11/2019 |
| CN | 110485482 | A | | 11/2019 |
| JP | 2001304924 | A | | 10/2001 |
| JP | 5389197 | B2 | | 1/2014 |
| KR | 20200037948 | A | * | 4/2020 |

* cited by examiner

SYSTEM AND METHOD FOR MONITORING EARTH PRESSURE AND DISPLACEMENT OF MINIATURE STEEL PIPE PILE BODY

TECHNICAL FIELD

The present disclosure relates to the field of pile foundation engineering field test technology, in particular to a system and method for monitoring the earth pressure and displacement of a miniature steel pipe pile body.

BACKGROUND

Miniature steel pipe pile generally refers to cast-in-place piles with a pile diameter of 100-300 mm, a length-to-diameter ratio greater than 30, and using strong reinforcement drilling and pressure grouting construction technology. The construction of the miniature steel pipe pile only needs light construction equipment, and has advantages such as flexible pile position, fast construction speed, strong adaptability to the construction site, and small environmental impact. Therefore, advanced miniature pile composite soil nail support of miniature steel pipe pile combined with soil nails and anchor rods, and miniature-pile-prestressed anchor composite soil-nailed walls are widely used in construction projects. Considering that the earth and rock stratum are not easy to drill and the process of placing the miniature steel pipe pile is extremely easy to damage the earth pressure gauge, in order to ensure that the lateral pressure of the earth may be monitored in real time during the excavation of the foundation pit and the earth pressure gauge can be protected in the process of foundation pit excavation, a metal protective shell is welded to the position where the earth pressure box is installed on the pile body. In the process of excavation, the miniature steel pipe pile is prone to bend and deform under the action of large lateral water and soil pressure. In order to effectively monitor the force action of miniature steel pipe pile, ensure construction safety and engineering quality, and provide data for design, it is necessary to monitor the lateral earth pressure of miniature steel pipe pile in real time during foundation pit excavation, thereby ensuring that the pressure on the steel pipe pile meets safety requirements. At the same time, in the process of excavation, the miniature steel pipe pile is easy to produce large lateral displacement under the action of large lateral water and soil pressure. In order to effectively monitor the displacement of miniature steel pipe pile, ensure construction safety and engineering quality, and provide data for design, it is necessary to monitor the displacement of miniature steel pipe pile in real time during foundation pit excavation to ensure that the displacement of miniature steel pipe pile is within the allowable value range.

At present, strain gauge stuck on the pile body is widely used in earth pressure detection of miniature steel pipe pile foundation. However, it is easy to be damp, has low survival rate, and the sealant cannot contain air bubbles. The inclinometer tube is mostly used to monitor the displacement of miniature steel pipe pile. In order to make the inclinometer tube successfully installed in place, it generally need to be deeper than the installation depth. It is difficult to adjust the direction and requires more manpower. The cost is high, and the acquisition port should be free when the output port transmits data.

SUMMARY

The purpose of the present disclosure is to overcome the shortcomings of the prior art, and to provide a system and method for monitoring the earth pressure and displacement of a miniature steel pipe pile body. Installation holes are formed on positions where earth pressure gauges will be installed on the miniature steel pipe pile body. Sensor metal protective shells are welded on outside of the miniature steel pipe pile body. The earth pressure gauges are stuck on outside of the miniature steel pipe pile body. Lateral earth pressure and internal force development of the miniature steel pipe pile body are measured. At the same time, reflective sheet base is welded at preset position of the miniature steel pipe pile body, and the reflective sheet is stuck on rectangular end support plate, such that the displacement and deformation of the miniature steel pipe pile bod are monitored at any time during excavation of foundation pit.

In order to achieve the above objectives, the technical solutions adopted by the present disclosure are as follows.

For the first aspect, an earth pressure and displacement monitoring system of a miniature steel pipe pile body is provided. The monitoring system includes a plurality of resistance-type miniature earth pressure gauges, a plurality of sensor metal protective shells, a resistance test strain gauge, a data storage device, a reflective sheet, supporting plates, and a reflective sheet base rebar end; wherein

- a plurality of sensor installation holes are arranged on the miniature steel pipe pile body; the resistance-type miniature earth pressure gauge is embedded in the sensor installation hole; the sensor metal protective shell is arranged at a position where the resistance-type miniature earth pressure gauge will be installed, a sensor is connected to the resistance test strain gauge through a transmission line, and the resistance test strain gauge is connected to the data storage device;
- a top beam is installed on a top of the steel pipe pile body, and waist beams are evenly distributed on an outer surface of the steel pipe pile body; the reflective sheet base rebar end is vertically welded at a position which is on the top beam and symmetrical to the sensor installation hole; a protruding end of the reflective sheet base rebar end is provided with the supporting plates, and the reflective sheet is installed on the supporting plates.

Further, vertical symmetry axes of the plurality of sensor installation holes are aligned along a vertical direction of the miniature steel pipe pile body, and a centroid of a cross section of each sensor installation hole coincides with a centroid of a load-bearing membrane side of a corresponding resistance-type miniature earth pressure gauge.

Further, the plurality of sensor metal protective shells are made of seamless steel pipe with a same material but different sizes as the miniature steel pipe pile body; the sensor metal protective shells are arranged by welding on positions where the resistance-type miniature earth pressure gauges will be installed on an outer surface of the miniature steel pipe pile body.

Further, positions where the resistance-type miniature earth pressure gauges will be installed are polished with an electric polisher and an arc part of the miniature steel pipe pile body is leveled.

Further, the resistance-type miniature earth pressure gauges adopt a bottom line outlet mode, and a bottom side with a line outlet of each resistance-type miniature earth pressure gauge is aligned with a corresponding sensor installation hole and installed in the sensor installation hole, and the resistance-type miniature earth pressure gauges are stuck on the miniature steel pipe pile body.

Further, a number of the resistance-type miniature earth pressure gauges is determined by a length of the miniature steel pipe pile body and a number of prestressed anchor rods.

Further, the reflective sheet base rebar end protrudes a distance from the top beam and the miniature steel pipe pile body.

For the second aspect, an assembly method of the earth pressure and displacement monitoring system of the miniature steel pipe pile body is provided. The assembly method includes:

(1) connecting the resistance-type miniature earth pressure gauges to the resistance test strain gauge and data storage device before the resistance-type miniature earth pressure gauges are installed on the miniature steel pipe pile; checking, on the one hand, whether the cable is broken, on the other hand, whether the resistance-type miniature earth pressure gauges are invalid;

(2) determining positions and size of the sensor installation holes on an outer wall of the miniature steel pipe pile body according to the position where the miniature earth pressure gauge will be installed; and forming the sensor installation holes on the miniature steel pipe pile body; wherein the centroid of the cross section of each sensor installation hole coincides with the centroid of the load-bearing membrane side of corresponding resistance-type miniature earth pressure gauge; after the miniature steel pipe pile body is cooled, polishing the position where the resistance-type miniature earth pressure gauge will be installed on the outer wall of the miniature steel pipe pile, and leveling the arc part of the miniature steel pipe pile body;

(3) welding the sensor metal protective shell at the position where the resistance-type miniature earth pressure gauge will be installed on the outer wall of the miniature steel pipe pile body; wherein the sensor metal protective shell is slightly lower than the resistance-type miniature earth pressure gauge in a length direction of the sensor metal protective shell;

(4) passing the transmission line of each resistance-type miniature earth pressure gauge from the sensor installation hole into inside of the miniature steel pipe pile body; inserting the resistance-type miniature earth pressure gauge into the sensor metal protective shell and sticking the resistance-type miniature earth pressure gauge on the miniature steel pipe pile body; wherein the load-bearing membrane side of the resistance-type miniature earth pressure gauge faces an earth body; connecting the resistance-type miniature earth pressure gauges to the resistance test strain gauge and the data storage device after the resistance-type miniature earth pressure gauges being firmly stuck; checking a survival rate of the resistance-type miniature earth pressure gauges to make it not lower than a set value; and replacing damaged resistance-type miniature earth pressure gauge with undamaged ones.

For the third aspect, a method for monitoring the earth pressure and displacement of the miniature steel pipe pile body by using the earth pressure and displacement monitoring system of the miniature steel pipe pile body is provided. The method includes:

(1) determining a construction spot of a miniature steel pipe pile in a construction site, and drilling a pile hole by using a down-the-hole drilling technology; wherein a diameter of the pile hole is slightly larger than a diameter of the miniature steel pipe pile; twitching up and down a drill stem to facilitate clearing the pile hole; placing the miniature steel pipe pile provided with the resistance-type miniature earth pressure gauges in the drilled pile hole and delivering to a design elevation of the miniature steel pipe pile;

(2) inserting a grouting pipe into a bottom of the miniature steel pipe pile, and injecting a mixed cement slurry into the miniature stool pipe pile through a grouting machine; wherein a process that the grouting pipe is inserted first and then the mixed cement slurry is injected is adopted; grouting holes are arranged on the miniature steel pipe piles in a vertical direction; during grouting process, a grouting pressure is ensured to reach a set value at all times; after grouting, the grouting pipe is not immediately pulled out; pulling out the grouting pipe to complete the grouting when the mixed cement slurry flows out of the miniature steel pipe pile again;

(3) forming a hole at a top position of the top beam; inserting the reflective sheet base rebar end into the top beam; filling a gap between the reflective sheet base rebar end and the top beam with cement slurry, and fixing the reflective sheet base rebar end and the top beam with expansion bolts; and sticking the reflective sheet on the supporting plates after a strength of the filled cement slurry meets design requirements; aiming, by an external total station, at a crosshair of the reflective sheet to perform a measurement for the first time of the miniature steel pipe pile;

(4) welding the reflective sheet base rebar end to the outer wall of the miniature steel pipe pile by two-side welding to ensure a welding quality after an excavation reaches a preset position; wherein the reflective sheet base rebar end protrudes from the miniature steel pipe pile body; then sticking the reflective sheet on the supporting plates, and aiming, by the external total station, at a crosshair of the reflective sheet at this position to perform a measurement for the first time;

(5) repeating step (4) with the excavation of a foundation pit; consecutively numbering and marking the reflective sheets from the top beam to the bottom of the miniature steel pipe pile; performing a measurement again to each position above a position that has been completed the measurement for the first time every time; and accumulating the measured displacement of the miniature steel pipe pile from top to bottom;

(6) connecting the resistance-type miniature earth pressure gauge and the resistance test strain gauge to the data storage device; and detecting a survival rate of the resistance miniature earth pressure gauge;

(7) after the grouting of step (1) is completed, and before the cement slurry is solidified, performing a monitoring for one time; during entire foundation pit excavation and support construction period and after the foundation pit excavation and support is completed, performing an observation once every set time, calculating the earth pressure of the miniature steel pipe pile body by using formula $P=\mu\varepsilon\times K$, wherein P is the pressure value in KPa; $\mu\varepsilon$ is the strain; K is the calibration coefficient.

Compared with the prior art, the present disclosure has the following beneficial effects:

The sensor installation holes are drilled at predetermined positions outside the steel pipe pile body and the sensor metal protective shell with a thickness slightly lower than that of the resistance-type miniature earth pressure gauge is welded on the steel pipe pile body. The resistance-type miniature earth pressure gauges are fixed on the steel pipe pile body. The transmission line of the resistance-type miniature earth pressure gauges passes through the sensor installation holes and are connected to data acquisition system. The reflective sheet base is welded at the preset position of the miniature steel pipe pile and the reflective sheet is attached to the reflective sheet base to realize displacement monitoring. The device has a simple structure, simple and convenient operations, a high measurement accuracy and survival rate, and a low cost and is reliable and stable. The manpower, material resources and time are saved. The device can monitor the earth pressure changes of the miniature steel pile support of the rock-soil foundation pit in real time, provide experimental data for the support theory of miniature steel pipe pile for on-site monitoring of rock foundation and provide reference value for engineering practice.

DETAILED DESCRIPTION OF PREFERRED EMBODIMENTS

Figure 1:
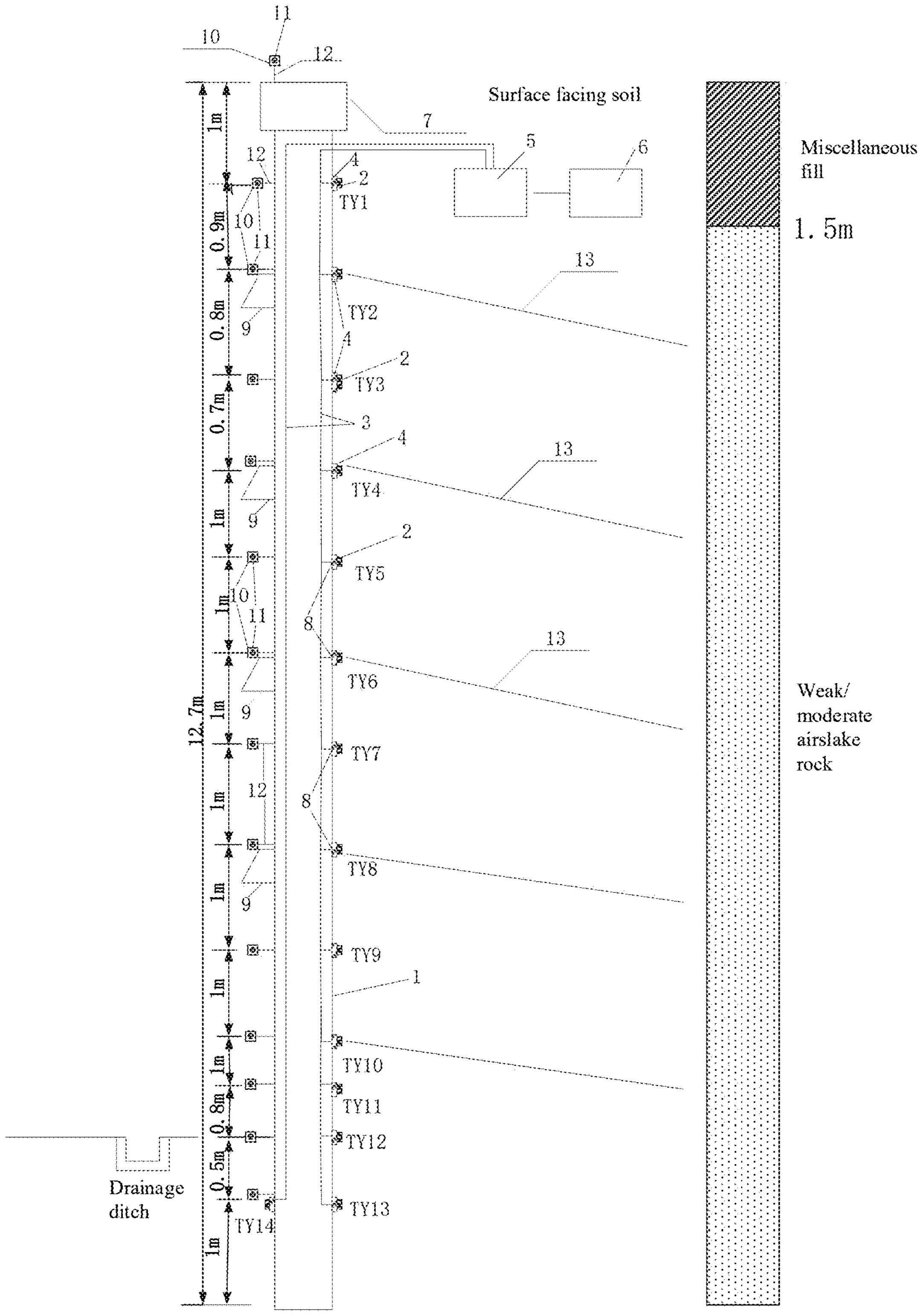
FIG. 1 is a schematic diagram of a main structure of an earth pressure and displacement monitoring device of a miniature steel pipe pile body of the present disclosure; wherein 1—miniature steel pipe pile; 2—resistance—type miniature earth pressure gauge; 3—transmission line; 4—sensor metal protective shell; 5—resistance test strain gauge; 6—data storage device; 7—top beam; 8—sensor installation hole; 9—waist beam; 10—supporting plates; 11—reflective sheet; 12—reflective sheet base rebar end; 13—prestressed anchor rod; 14—bar glue; 15—welding seam.
Figure 2:
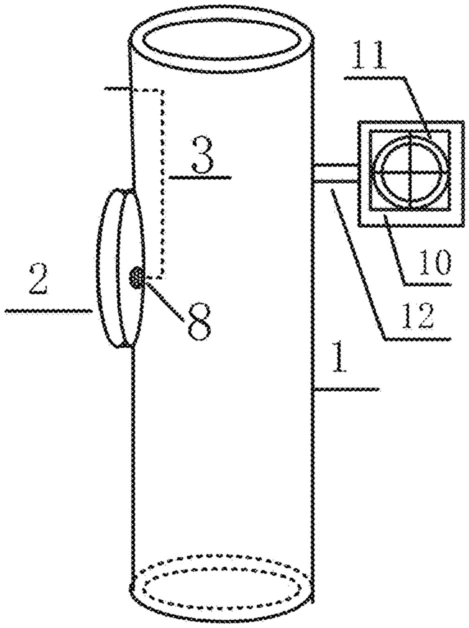
FIG. 2 is a schematic diagram of an installation structure of the reflective sheet of the present disclosure.
Figure 3:
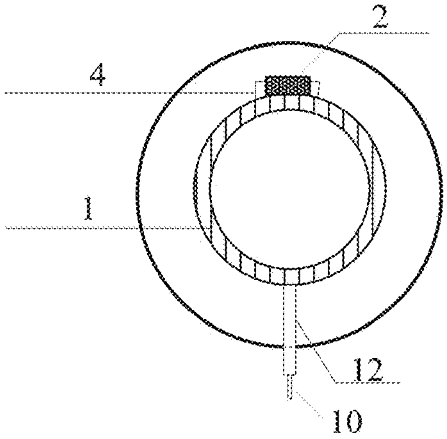
FIG. 3 is a cross-sectional view of the structure of the reflective sheet of the present disclosure after installation.
Figure 4:
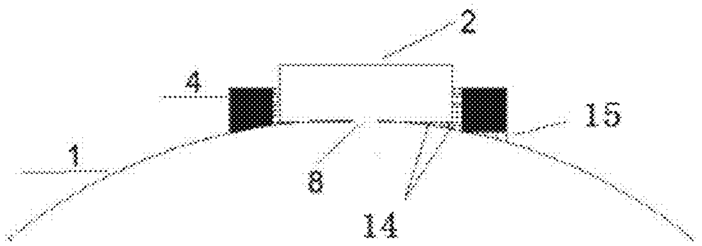
FIG. 4 is a schematic installation diagram of the resistance-type miniature earth pressure gauge of the present disclosure.

It should be pointed out that the following detailed descriptions are all illustrative and are intended to provide further descriptions of the present disclosure. Unless otherwise specified, all technical and scientific terms used in the present disclosure have the same meanings as commonly understood by those of ordinary skill in the technical field to which the present disclosure belongs.

It should be noted that the terms used here are only for describing specific embodiments, and are not intended to limit the exemplary embodiments according to the present disclosure. As used herein, unless the present disclosure clearly indicates otherwise, the singular form is also intended to include the plural form. In addition, it should also be understood that when the terms "comprising" and/or "including" are used in this specification, they indicate the existence of features, steps, operations, devices, components, and/or their combinations;

For the convenience of description, if the words "up", "down", "left" and "right" appear in the present disclosure, they only mean that they are consistent with the up, down, left, and right directions of the drawings themselves, and do not limit the structure. It is for the convenience of describing the present disclosure and simplifying the description, rather than indicating or implying that the device or element referred to must have a specific orientation, be constructed and operated in a specific orientation, and therefore cannot be understood as a limitation of the present disclosure.

Hereinafter, the present disclosure will be further described in detail through embodiments.

EMBODIMENT

A main structure of an arrangement device of a resistance-type miniature earth pressure gauge of a miniature steel pipe pile body in this embodiment includes a miniature steel pipe pile 1, a resistance-type miniature earth pressure gauge 2, a transmission line 3, a sensor metal protective shell 4, and a resistance test strain gauge 5, a data storage device 6, a top beam 7, a sensor installation hole 8, a waist beam 9, supporting plates 10, a reflective sheet 11, and a reflective sheet base rebar end 12;

The miniature steel pipe pile 1 in this embodiment uses a seamless steel pipe with a diameter of 127 mm, a thickness of 5 mm, and a length of 12.7 meters; of course, it is not difficult to understand that in other embodiments, the miniature steel pipe piles 1 of other sizes can also be used for construction.

There are a plurality of sensor installation holes 8 arranged in sequence along an axial direction of the miniature steel pipe pile 1, preferably the plurality of sensor installation holes 8 are evenly arranged, and in this embodiment, the sensor installation holes 8 are formed as circular holes in the miniature steel pipe pile 1 by flame cutting, and vertical centerlines of the circular holes are parallel to an axis of the miniature steel pipe pile 1; specifically, the sensor installation holes 8 may be circular holes with a diameter of 5 mm, and during specific installation, a centroid of a cross-sectional of each sensor installation hole 8 is coincident with a centroid of a load-bearing membrane side of a corresponding resistance-type miniature earth pressure gauge 2; each resistance-type miniature earth pressure gauge 2 is installed in a corresponding circular hole; all the resistance-type miniature earth pressure gauges 2 are arranged in parallel. It should be noted that in the actual measurement, a number and spacing of the resistance-type miniature earth pressure gauges 2 are selected according to the accuracy requirements of the actual measurement. The general setting principle is that the higher the accuracy requirement is, the denser the resistance-type miniature earth pressure gauges 2 are set, the lower the accuracy requirement, and the sparser the resistance-type miniature earth pressure gauges 2 are set.

Further, the sensor metal protective shell 4 is made of seamless stool pipe with the same material but different sizes as the miniature steel pipe pile 1. For example, the specific size of the sensor metal protective shell 4 may be 25 mm in inner diameter, 5 mm in length, and 5 mm in wall thickness; and in actual construction, the sensor metal protective shell 4 is arranged by welding on a position where the resistance-type miniature earth pressure gauge will be installed on the outer surface of the miniature steel pipe pile 1. Electric polisher is used to polish the position where the resistance type miniature earth pressure gauge 2 will be installed and an arc part of the miniature stool pipe pile 1 is levelled. —The sensor metal protective shell 4 is used to protect the resistance-type miniature earth pressure gauge 2. —

Further, the resistance-type miniature earth pressure gauge 2 in this embodiment may be an XY-TY02A resistance-type miniature earth pressure gauge 2. In other embodiments, the resistance-type miniature earth pressure gauges of other models may also be adopted. The XY-TY02A resistance-type miniature earth pressure gauge 2 in this embodiment adopts a bottom line outlet mode, and has a diameter of 20 mm and a thickness of 6.5 mm. The measuring range is determined to be 5 MPa according to actual engineering needs. The number of the XY-TY02A resistance-type miniature earth pressure gauges 2 is determined by a pile length of the miniature steel pipe pile 1 and the number of pre-stressed anchor rods; a bottom side with the line outlet of the XY-TY02A resistance-type miniature earth pressure gauge 2 is aligned with the sensor installation hole 8 and inserted into the sensor installation hole S. The XY-TY02A resistance-type miniature earth pressure gauge 2 is stuck on the miniature steel pipe pile 1. The transmission line 3 may be a hydraulic cable with a diameter of 3 mm and a waterproof effect, or other cables, which depends on actual engineering needs. The transmission line 3 is connected to the XY-TY02A resistance-type miniature earth pressure gauge 2, and the wire end of the transmission line 3 passes through the sensor installation hole 8, and finally reaches a top of the miniature steel pipe pile 1 and is connected to the resistance test strain gauge 5, and the resistance test strain gauge 5 is connected to the data storage device 6 to achieve monitoring of earth pressure of the miniature steel pipe pile 1.

Further, the main structure of a displacement monitoring device of the miniature steel pipe pile body includes the miniature steel pipe pile, the reflective sheet, the top beam, a reflective sheet base formed by connecting the reflective sheet base rebar end and the supporting plates, the waist beams, the pre-stressed anchor rod, and a welding seam. The top beam is installed on a top of the miniature steel pipe pile, and the waist beams are evenly distributed on the outer surface of the miniature steel pipe pile. The reflective sheet base rebar end is vertically welded to a preset position of the miniature steel pipe pile, and the welding seam is formed at a welding place between the reflective sheet base rebar end and the miniature steel pipe pile, the reflective sheet base rebar end protrudes 50 mm from the miniature steel pipe pile, the reflective sheet base rebar end protruding from the miniature steel pipe pile is installed with a rectangular end support plate, the reflective sheet is installed on the end support plate, and the top of the top beam is also provided with the reflective sheet base. The reflective sheet base on the top of the top beam is fixed on the top beam by expansion bolts. A number of reflective sheet bases and reflective sheets on the miniature steel pipe pile is determined by a length of the miniature steel pipe pile. During foundation pit excavation, the reflective sheet base is welded on the steel pipe pile with a slight horizontal deflection of 15° when the foundation pit is excavated to the preset position every time. A total station is used to aim at a crosshair of the reflective sheet, a measurement for the first time of the position is made and the measured displacement of the miniature steel pipe pile is accumulated from top to bottom. And the total station is used to measure the Longitude and Latitude of the crosshair of the reflective sheet.

Further, in this embodiment or some other embodiments, the aforementioned reflective sheet base rebar end may be designed to be 8 mm in diameter and 20 cm in length; the supporting plates 10 may be designed to be 5 cm in length, 4 cm in width, and 3 mm in thickness. And the dimension of the reflective sheet of the present disclosure may be designed to be 3 cm×3 cm.

Further, this embodiment also provides an assembly method of the earth pressure and displacement monitoring system of the miniature steel pipe pile body, including:

(1) the XY-TY02A resistance-type miniature earth pressure gauges 2 are connected to the resistance test strain gauge 5 and data storage device 6 before the XY-TY02A resistance-type miniature earth pressure gauges 2 are installed on the miniature steel pipe pile 1; it is checked, on the one hand, whether the cable is broken, on the other hand, whether the XY-TY02A resistance-type miniature earth pressure gauges 2 are invalid;

(2) according to the installation positions of the XY-TY02A resistance-type miniature earth pressure gauges on the miniature steel pipe pile, the positions and size of the sensor installation holes 8 are drawn on outer surface of the pile body of the miniature steel pipe pile 1 with chalk at distances of 1 m, 1.9 m, 2.7 m, 3.4 m, 4.4 m, 5.4 m, 6.4 m, 7.4 m, 8.4 m, 9.4 m, 10.4 m, 11.2 m, 11.7 m from the top of the miniature steel pipe pile 1; the sensor installation holes are formed on the miniature steel pipe pile 1 by flame cutting; the centroid of the cross-sectional of each sensor installation hole 8 is coincident with the centroid of the load-bearing membrane side of corresponding resistance-type miniature earth pressure gauge 2; after the miniature steel pipe pile is cooled, an electric polisher is used to polish the positions on the miniature steel pipe pile 1 where the XY-TY02A resistance-type miniature earth pressure gauges 2 will be installed and the arc part of the miniature steel pipe pile 1 is levelled.

(3) the sensor metal protective shell 4 with an inner diameter of 34 mm, a length of 10 mm, and a wall thickness of 5 mm is welded on each position on the miniature steel pipe pile 1 where the XY-TY02A resistance-type miniature earth pressure gauge 2 will be installed; the sensor metal protective shell 4 is slightly lower than the XY-TY02A resistance-type miniature earth pressure gauge 2 in a length direction;

(4) the transmission line 3 of each XY-TY02A resistance-type miniature earth pressure gauge 2 is passed into the miniature steel pipe pile 1 from the position of a corresponding sensor installation hole 8; and the XY-TY02A resistance-type miniature earth pressure gauge with a diameter of 29 mm and a thickness of 11 mm is inserted into the sensor metal protective shell 4 and stuck on the miniature steel pipe pile 1, the force-bearing membrane side of the XY-TY02A resistance-type miniature earth pressure gauge 2 faces the earth, and the resistance test strain gauge 5 is connected to the data storage device 6; the survival rate of XY-TY02A resistance-type miniature earth pressure gauge 2 is chocked to make it not less than 90%; the damaged XY-TY02A resistance-type miniature earth pressure gauges 2 are replaced with the undamaged ones.

Further, this embodiment also provides an method for the earth pressure and displacement monitoring system of the miniature steel pipe pile body, including:

(1) a construction spot of the miniature steel pipe pile 1 at construction site is determined, and the down-the-hole drilling technology is used to drill a pile hole with a diameter of 180 mm; the diameter of the pile hole is slightly larger than that of the miniature steel pipe pile 1; in order to make a pile hole wall as smooth as possible to ensure that the XY-TY02A resistance type miniature earth pressure gauge 2 will not be damaged during inserting of the miniature steel pipe pile 1 into the pile hole, the drill stem is twitched up and down several times during construction to clear the pile hole; the miniature steel pipe pile 1 installed with the XY-TY02A resistance-type miniature earth pressure gauges 2 is put into the drilled pile hole; the miniature steel pipe pile 1 is slowly inserted into the drilled pile hole to the design elevation; during the construction of the miniature steel pipe pile 1, the XY-TY02A resistance-type miniature earth pressure gauges 2 and the sensor metal protective shells 4 should be protected;

(2) a grouting pipe is inserted into a bottom of the miniature steel pipe pile 1, and the mixed cement slurry is slowly injected into the miniature steel pipe pile 1 through a grouting machine; a water-cement ratio of the cement slurry is 0.5:1, and the grouting of the miniature steel pipe pile 1 adopts the process that the grouting pipe is inserted first and then the cement slurry is injected; grouting holes are arranged on the miniature steel pipe piles 1 in the vertical direction according to the actual geological conditions; when the miniature steel pipe pile 1 passing through the earth and strongly airslake rocks, two grouting holes with a diameter of 15 mm are set every 500 mm; the grouting holes are arranged staggered in a plum blossom shape; during the grouting process, a pressure gauge on the grouting pipe needs to always be paid attention to ensure that the grouting pressure reaches 0.5 MPa; after grouting, the grouting pipe is not pulled out until the cement slurry flows out from the miniature steel pipe pile 1, then the grouting pipe is pulled out, an end of the miniature steel pipe pile 1 is sealed, a pressure is applied for 5 minutes, the grouting pipe is pulled out until the cement slurry flows out from the steel pipe again, and the grouting operation is completed;

(3) a hole with a diameter of 10 mm is formed at the top of the top beam 7, the reflective sheet base rebar end 12 is inserted into the top beam 7 for 10 cm, and a cement slurry with a water-cement ratio of 0.5:1 is used to fill a gap between the reflective sheet base rebar end 12 and the top beam 7, and then the two are fixed by expansion bolts; when the strength of the cement slurry meets the design requirements, the reflective sheet 11 is stuck on the supporting plates 10, and an external total station aims at the crosshair of the reflective sheet 11 to perform a measurement for the first time of the miniature steel pipe pile 1;

(4) during the excavation process of the foundation pit, when the foundation pit is excavated to the preset position, the reflective sheet base rebar end 12 is substantially vertically welded to the outer wall of the miniature steel pipe pile 1 by two-side welding to ensure the welding quality; the reflective sheet base rebar end 12 protrudes the miniature steel pipe pile 1 by 50 mm; then the reflective sheet 11 with a dimension of 3 cm×3 cm is stuck on the supporting plates 10, and the total station is used to aim at the crosshair of the reflective sheet 2 at this position for a measurement for the first time;

(5) the operation of step (4) is repeated with the excavation of the foundation pit; the reflective sheets 11 from the top beam 7 to the bottom of the miniature steel pipe pile 1 are consecutively numbered and marked; each position above a position that has been completed the measurement for the first time is measured again; and the measured displacement of the miniature steel pipe pile is accumulated from top to bottom;

(6) the XY-TY02A resistance-type miniature earth pressure gauge 2 and the resistance test strain gauge 5 are connected to the data storage device 9, and the survival rate of the XY-TY02A resistance-type miniature earth pressure gauge 2 is detected;

(7) after the grouting of step (1) is completed, and before the cement slurry is solidified, monitoring is performed one time; during the entire foundation pit excavation and support construction period, an observation is performed once a day; after the foundation pit excavation and support is completed, the observation is performed every 3-7 days; the formula $P=\mu\varepsilon \times K$ is used to calculate the earth pressure of the miniature steel pipe pile body, where P is the pressure value in KPa; $\mu\varepsilon$ is the strain; K is the calibration coefficient.

The above descriptions are only preferred embodiments of the present disclosure and are not used to limit the present disclosure. For those skilled in the art, the present disclosure can have various modifications and changes. Any modification, equivalent replacement, improvement, etc. made within the spirit and principle of the present disclosure should be included in the protection scope of the present disclosure.

What is claimed is:

1. An earth pressure and displacement monitoring system of a steel pipe pile body, comprising:

resistance-type earth pressure gauges,
sensor metal protective shells,
a resistance test strain gauge,
a data storage device,
reflective sheets,
supporting plates, and
reflective sheet base rebar ends; wherein sensor installation holes are arranged on the steel pipe pile body; the sensor metal protective shells are arranged at positions where the resistance-type earth pressure gauges being installed, resistance-type earth pressure gauges are connected to the resistance test strain gauge through a transmission line, and the resistance test strain gauge is connected to the data storage device;

a top beam is installed on a top of the steel pipe pile body, and waist beams are evenly distributed on an outer surface of the steel pipe pile body; a protruding end of each reflective sheet base rebar end is provided with a supporting plate, and each reflective sheet is installed on the supporting plate.

2. The earth pressure and displacement monitoring system of claim 1, wherein a centroid of a cross section of each sensor installation hole coincides with a centroid of a load-bearing membrane side of a corresponding resistance-type earth pressure gauge.

3. The earth pressure and displacement monitoring system of claim 1, wherein the sensor metal protective shells are made of seamless steel pipe with a same material but different sizes as the miniature steel pipe pile body.

4. The earth pressure and displacement monitoring system of claim 1, wherein the sensor metal protective shells are arranged by welding on positions where the resistance-type earth pressure gauges being installed on an outer surface of the miniature steel pipe pile body.

5. The earth pressure and displacement monitoring system of claim 1, wherein positions where the resistance-type earth pressure gauges being installed are polished with an electric polisher and an arc part of the miniature steel pipe pile body is leveled.

6. The earth pressure and displacement monitoring system of claim 1, wherein a bottom side with a line outlet of each resistance-type earth pressure gauge is aligned with a corresponding sensor installation hole and installed in the sensor installation hole, and the resistance-type earth pressure gauges are stuck on the miniature steel pipe pile body.

7. The earth pressure and displacement monitoring system of claim 1, wherein each reflective sheet base rebar end protrudes a distance from the top beam and the miniature steel pipe pile body.

8. An assembly method of the earth pressure and displacement monitoring system of a steel pipe pile body according to claim 1, comprising:

(1) checking whether resistance-type earth pressure gauges are able to work normally;

(2) determining positions and size of sensor installation holes on an outer wall of the steel pipe pile body according to positions where the earth pressure gauges are installed; and forming the sensor installation holes on the steel pipe pile body; wherein a centroid of a cross section of each sensor installation hole coincides with a centroid of a load-bearing membrane side of corresponding resistance-type earth pressure gauge; after the steel pipe pile body is cooled, polishing the positions where the resistance-type earth pressure gauges are installed on the outer wall of the steel pipe pile, and leveling an arc part of the steel pipe pile body;

(3) welding sensor metal protective shells at the positions where the resistance-type earth pressure gauges are installed on the outer wall of the steel pipe pile body;

(4) passing a transmission line of each resistance-type earth pressure gauge from each sensor installation hole into the steel pipe pile body; inserting the resistance-type earth pressure gauges into the sensor metal protective shells and sticking the resistance-type earth pressure gauges on the steel pipe pile body; wherein the load-bearing membrane side of the resistance-type earth pressure gauge faces an earth body; communicating the resistance-type earth pressure gauges to the resistance test strain gauge and the data storage device after the resistance-type earth pressure gauges are firmly stuck; checking a survival rate of the resistance-type earth pressure gauges to make it not lower than a set value; and replacing damaged resistance-type earth pressure gauges with undamaged ones.

* * * * *